United States Patent [19]

Williams

[11] 4,377,384
[45] Mar. 22, 1983

[54] THREE-DIMENSIONAL TEACHING DEVICE

[76] Inventor: Donald R. Williams, 3467 W. 67th St., Los Angeles, Calif. 90043

[21] Appl. No.: 266,741

[22] Filed: May 26, 1981

[51] Int. Cl.³ .................... G09B 1/14; G09B 19/02
[52] U.S. Cl. .................................. 434/209; 434/190; 40/607; 108/108
[58] Field of Search ............... 434/191, 190, 192, 204, 434/205, 209, 203, 210, 172; 40/606, 607; 108/61, 108, 152

[56] References Cited

U.S. PATENT DOCUMENTS

| 1,273,397 | 7/1918 | Neill | 108/152 X |
| 2,722,754 | 11/1955 | Slote | 434/190 |
| 2,802,291 | 8/1957 | Bach et al. | 40/606 X |
| 3,081,718 | 3/1963 | Shoffner | 108/108 |
| 3,966,056 | 6/1976 | Larson | 108/152 X |

FOREIGN PATENT DOCUMENTS

| 271707 | 3/1914 | Fed. Rep. of Germany | 434/172 |
| 583153 | 8/1933 | Fed. Rep. of Germany | 434/172 |
| 947263 | 2/1956 | Fed. Rep. of Germany | 434/172 |

Primary Examiner—William H. Grieb
Attorney, Agent, or Firm—Erik M. Arnhem

[57] ABSTRACT

A three-dimensional device for teaching mathematical problems, comprising a stand having a number of open-ended shelves extending therefrom, the surfaces of said shelves being adapted to removably and interchangeably receive slides carrying different digits to set-up various mathematical problems, as conventionally done by paper and pen.

2 Claims, 2 Drawing Figures

THREE-DIMENSIONAL TEACHING DEVICE

BACKGROUND OF THE INVENTION (1) Field of the Invention

My invention concerns a three-dimensional device for teaching, in particular children how to set-up and solve simple mathematical problems.

The idea underlying the invention is to bring about an actual three-dimensional model or copy of the set-up for different mathematical computations (conventionally made with paper and pencil) with interchangeable digits, so that the novice to such problems not only may comprehend how these problems are solved, but also why certain steps are necessary to obtain the end result.

(2) Prior Art

The inventor carried out a preliminary patentability search, but was unable to locate any pertinent prior art.

SUMMARY OF THE INVENTION

More particularly, the three-dimensional teaching aid, according to the invention, changes the conventional and sometime tedious way of presenting various mathematical problems on the blackboard into a more interesting and lively way of demonstrating mathematical problems.

My invention, for illustrative purposes only, is described herein by means of a simple divisional model. Obviously, the device may easily be adapted to present more complicated problems, such as multiplication of fractions, division of decimals, etc., as will appear from the following description.

Thus, for example, in setting up a practical division problem, one, normally places the underlined divisor to the left with the dividend overlined and the answer on top of the latter.

This set-up, as carried out with paper and pencil, is transformed into a three-dimensional model, i.e., a stand with a number of shelves on which the required digits may be placed to e.g., demonstrate the division of numbers.

It is, therefore the primary object of the invention to provide a device, primarily for teaching mathematics by using a three-dimensional model instead of the usual set-up with paper and pencil.

It is a further object of the invention to provide means for quickly, respectively, placing and removing digits on and from the device.

Additional advantages of the teaching device will appear from the more detailed description of the invention.

DESCRIPTION OF THE INVENTION

Figure 1:
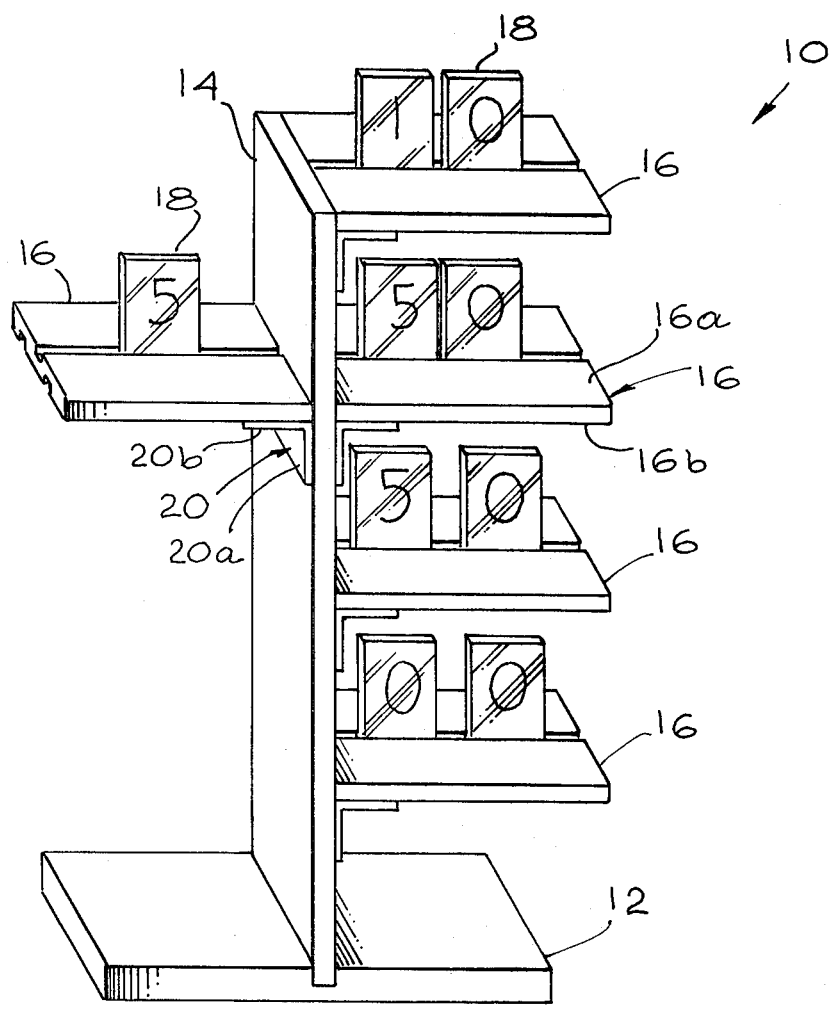
FIG. 1 is a perspective view of a stand with a number of shelves, according to the invention, set up for a division-of-digits problem.

In the drawings like reference characters designate similar parts in the several views of the drawings.

Figure 2:
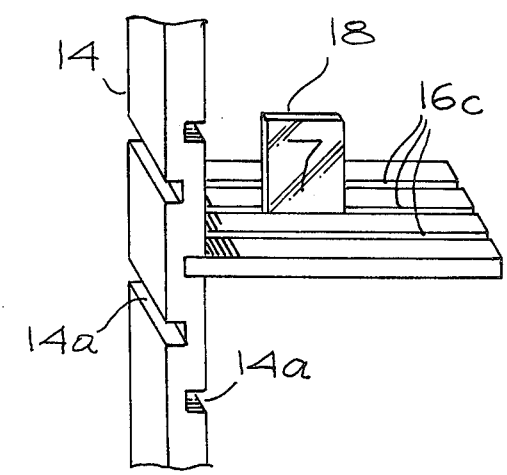
FIG. 2, is a top partial view of a portion of the stand with a shelf onto which a numbered slide is attached.

In FIG. 1, numeral 10 indicates the device in its entirety, comprising a stand having a base 12 and an upright 14 from which a number of open-ended shelves 16 extends horizontally from opposite sides of the upright. Each of the upper and lower surfaces, respectively 16a, b of shelves 16 is adapted to removably receive at least one slide 18, having a digit printed, engraved or attached thereto. Shelf surfaces 16a, b, may be provided with tracks 16c, shown in FIGS. 1 or 2, extending along the entire or part of the length of shelf surfaces 16a, b, and within which digital slides 18 may be slidingly pressure fitted. The slide 18 may, preferably consist of a rectangular piece of transparent acrylic plastic material. The slides may, obviously be attached to the shelf surfaces in any appropriate manner, for example, magnetically, by pressure fitting the slides 18 into a single groove running lengthwise on shelf surfaces 16a, b, etc.

The shelf surfaces may be mounted to upright 14 by means of angular brackets 20 (as illustrated in FIG. 1), the interior side 20a of which is e.g., glued onto the upright. Shelves 16 may then be glued, screwed or otherwise appropriately fastened to the upper surface 20b of the horizontally extending portion of bracket 20.

One could also provide upright 14 with means for removably receiving shelves 16, e.g., by pressure fitting the latter into variable levelled horizontal slots 14a in the upright (FIG. 2), in order to change the set-up according to the mathematical problems to be demonstrated.

As noted, the drawings illustrate the device arranged for presentation of a division of numbers.

On the left hand side of upright 14, a first slide 18 with the number 5, as divisor, is inserted. Oppositely, a second slide with number 50 (dividend) is inserted; on top thereof a third slide with number 10, the "answer" appears. The slides beneath the dividend, carrying numbers 50 and zero, respectively, show that there was no surplus or decimals.

It would also be possible to multiply, add, etc. fractions on the device, by for example placing numerators on surfaces 16a and denominators on (e.g. magnetic) surface 16b of slides 16.

The device could also be rearranged to teach geography (or other subjects) placing the key word e.g., a country on the left hand side of upright 14 and the capital, rivers, mountains, etc., on the shelves on the right hand side thereof.

While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended claims.

I claim:

1. In a three dimensional teaching device, comprising:
    (a) a stand, including a base and an upright;
    (b) a plurality of horizontally extending surfaced shelves, mounted fixedly to and extending from the left and right hand side, respectively of the upright;
    (c) a plurality of slides, respectively impressed with digits for vertical removable mounting on the surfaces of the shelves each of said shelves being capable of carrying more than one slide, in such a manner as to constitute, in combination with the shelves, on which they are mounted, a graphic presentation of a variety of mathematical problems and their solutions.

2. A three dimensional teaching device, according to claim 1, wherein the device is presenting a divisional problem and its solution, having at least one first digit bearing slide mounted on a first shelf, disposed at the left hand side of the upright, so as to constitute, in combination an underlined divisor, and at least one second digit bearing slide, mounted on a second shelf, disposed at the right hand side of the upright, and at least one third digit bearing slide mounted on a third shelf above the second slide, the latter in combination with the third shelf constituting an overlined dividend and the third digit bearing slide on the third shelf constituting the resultant of the divisional problem.

* * * * *